March 7, 1950     W. D. NUPP     2,499,410
RADIO RECEIVER IGNITION INTERFERENCE TESTER
Filed Jan. 17, 1946
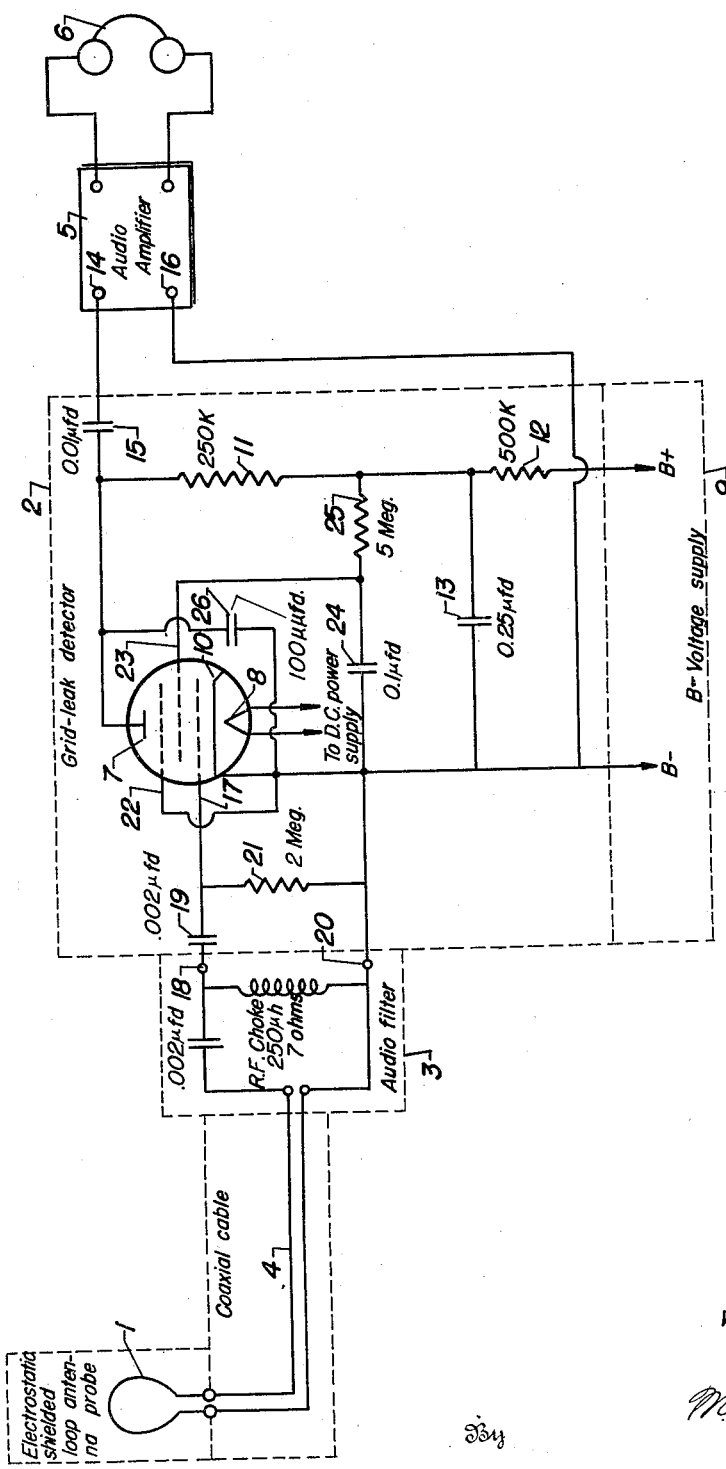
Inventor
Warren D. Nupp
By M. O. Hayes
Attorney Patented Mar. 7, 1950

2,499,410

UNITED STATES PATENT OFFICE 2,499,410

RADIO RECEIVER IGNITION INTERFERENCE TESTER

Warren D. Nupp, Drexel Hill, Pa.

Application January 17, 1946, Serial No. 641,854

3 Claims. (Cl. 250—20)

(Granted under the act of March 3, 1883, as amended April 30, 1928; 370 O. G. 757)

This invention relates to an improvement in electrical apparatus for detecting radio noise from ignition systems.

The use of tuned receivers for locating and measuring radio noise from the ignition system of aircraft engines has required a multiplicity of test equipment and experienced personnel for its operation, largely due to the extensive frequency spectrum involved. My invention has the advantages of being simple, it eliminates the usual tuned circuits, and obtains as wide a frequency response as possible. It combines sufficient sensitivity with simplicity, thereby having considerable utility for use by inexperienced personnel involved in detecting and eliminating radio noise from ignition systems.

The figure of the drawing is a wiring diagram disclosing my invention.

Numeral 1 consists of a three-inch electrostatically shielded, loop antenna probe for magnetic R. F. pick-up. It is connected to an untuned grid-leak detector 2 and audio filter 3 by means of coaxial cable 4. Audio amplifier 5 is connected between headphones 6 and detector 2. Said headphones are used for monitoring the output. Use of the loop probe necessitated the audio filter 3 preceding the detector 2 to eliminate the sginal produced by the audio frequency magnetic field about a magneto, since this field produces a very strong signal regardless of the condition of radio shielding provided by a magneto housing. Although the audio filter 3 removes this signal conductively, the detector 2 must be kept at least three feet from a magneto to prevent direct pick-up unless the detector is provided with magnetic shielding in addition to radio shielding. The coaxial cable from the loop to the detector must be short to obtain best sensitivity. Four and one-half feet of coaxial cable have been used with good results.

The B-voltage supply 9 can be any conventional source of continuing voltage, such as a battery, adequate to give the high voltage demanded by the plate 7 of detector 2.

The A-voltage supply, which supplies the filament 8 of detector 2, can be any conventional source of direct current power supply, such as a battery or rectified commercial voltage, adequate to give the voltage demanded by the filament 8. Direct current is preferred because it removes alternating current hum encountered in the normal operation from a 110 volt 60-cycle line.

The plate 7 cathode 10 circuit is connected across B-voltage supply 9 through load resistors 11 and 12. By-pass condenser 13 is connected across said B-voltage supply. Plate 7 is connected to one of the input terminals 14 of amplifier 5 through coupling capacitor 15. The other terminal 16 of amplifier 5 is connected to the negative side of said B-voltage supply. Control grid 17 is connected to audio filter output terminal 18 through grid capacitor 19; audio filter output terminal 20 is electrically connected to the negative side of B-voltage supply. Grid-leak resistor 21 is connected between said control grid 17 and negative side of said B-voltage supply 9.

Suppressor grid 22 is connected to the cathode 10; screen grid 23 is connected to the cathode return through capacitor 24, and to the plate circuit intermediate resistors 11 and 12, through resistor 25. Capacitor 26 is connected between plate 7 and cathode 10.

Operation

The loop antenna probe 1 is moved about and over a magneto or other portion of an ignition system in search of a source of radio noise. Radio frequency noise energy emanated by said magneto is picked up by the loop antenna probe. From the loop antenna the picked up energy is fed into the audio filter 3, through coaxial cable 4. Said filter eliminates the signal produced by the strong audio frequency magnetic field about a magneto. The radio frequency output is then fed into grid-leak detector 2 which changes the alternating high frequency noise signal voltages into pulsating current, and otherwise amplifies. The pulsating current output is amplified 5 and fed into the headphone where the electric pulsations are converted into sound energy. No tuning is necessary as the circuit is untuned and responds to a wide range of frequencies. A sound heard in the headphones is an indication that the probe is over a radio noise-emitting source. Measures can then be taken to shield or otherwise eliminate the disturbance at such source.

While I have shown a particular embodiment of my invention, it will be understood, of course, that I do not wish to be limited thereto, since many modifications may be made by those skilled in the art.

The invention described herein may be manufactured and used by or for the Government of the United States of America for governmental purposes without the payment of any royalties thereon or therefor.

What is claimed is:

1. An ignition interference tester, comprising: an electro-statically shielded loop antenna probe; an audio filter; a coaxial cable connecting said probe and said filter; an audio amplifier; an untuned grid-leak detector connected between said filter and said amplifier; and a headphone connected across the output of said amplifier.

2. An ignition interference tester, comprising: an electro-statically shielded loop antenna probe; an audio filter connected to the output of said antenna; a headphone; and an untuned magnetically and radio shielded detector connected across the output and input terminals of said filter and said headphone, respectively.

3. An ignition interference tester, comprising: an electro-statically shielded loop antenna probe pick-up; an audio filter of a non-dissipating type, a low-loss transmission line connecting said probe and said filter; a high gain audio amplifier; an untuned grid-leak detector connected between said filter and said amplifier; and a headphone connected across the output of said amplifier.

WARREN D. NUPP.

REFERENCES CITED

The following references are of record in the file of this patent:

UNITED STATES PATENTS

| Number | Name | Date |
|---|---|---|
| 1,606,283 | Wolf | Nov. 9, 1926 |
| 1,757,333 | Ranger | May 6, 1930 |
| 1,811,357 | Karplus | June 23, 1931 |
| 2,064,469 | Haeff | Dec. 15, 1936 |
| 2,192,321 | Meier | Mar. 5, 1940 |